US00H002152H

(19) United States
(12) Statutory Invention Registration
Dodge

(10) Reg. No.: US H2152 H
(43) Published: Apr. 4, 2006

(54) TELEMETRY SYSTEM HAVING AMPLITUDE MODULATION OF WALSH FUNCTIONS

(75) Inventor: Carl Dodge, Houston, TX (US)

(73) Assignee: Halliburton Energy Services, Inc., Houston, TX (US)

(21) Appl. No.: 09/765,220

(22) Filed: Jan. 18, 2001

(65) Prior Publication Data

US 2002/0122464 A1 Sep. 5, 2002

(51) Int. Cl.
*H04B 15/00* (2006.01)

(52) U.S. Cl. ..... 375/141; 375/298; 375/340

(58) Field of Classification Search ..... 375/295, 375/216, 296, 261, 262; 340/854.9; 370/228
See application file for complete search history.

(56) References Cited

U.S. PATENT DOCUMENTS

| | | | | | |
|---|---|---|---|---|---|
| 3,514,750 | A | * | 5/1970 | Pritchett et al. | 340/854.9 |
| 4,358,853 | A | * | 11/1982 | Qureshi | 375/296 |
| 4,646,326 | A | * | 2/1987 | Backof et al. | 375/261 |
| 5,233,629 | A | * | 8/1993 | Paik et al. | 375/262 |
| 5,253,271 | A | * | 10/1993 | Montgomery | 375/295 |
| 5,642,379 | A | * | 6/1997 | Bremer | 375/216 |
| 6,101,168 | A | * | 8/2000 | Chen et al. | 370/228 |

OTHER PUBLICATIONS

Harmuth, H.F.; Applications of Walsh functions in Communications; IEEE Spectrum; November 1969; pp. 82–91.*

* cited by examiner

*Primary Examiner*—Daniel Pihulic
(74) *Attorney, Agent, or Firm*—Conley, Rose & Tayon, P.C.

(57) ABSTRACT

A digital communications system employing modulated Walsh functions to convey data across a communications channel. In one embodiment, the system includes a transmitter having a constellation encoder, and a Walsh constellation modulator. The constellation encoder receives a sequence of data words and converts it into a sequence of constellation signal point labels. The modulator receives the sequence of labels, and responsively generates one or more amplitude-modulated Walsh functions which are summed to produce a modulated signal. The modulated signal passes through a communications channel to a receiver. The receiver includes an analog-to-digital converter (ADC) and a demodulation circuit. The ADC oversamples the received signal. The demodulation circuit manipulates the sign of the samples to effectively multiply the received samples with one or more Walsh functions, and sums the resulting values over one symbol interval to determine the modulated amplitude of the corresponding functions.

8 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TELEMETRY SYSTEM HAVING AMPLITUDE MODULATION OF WALSH FUNCTIONS

BACKGROUND OF THE INVENTION

1. Field of the Invention

The present invention relates to a telemetry system for digital transmission of data. More particularly, the present invention relates to a system and method using amplitude modulation of Walsh functions for data transmission, thereby simplifying the system design.

2. Description of the Related Art

Information in digital form possesses many advantages over information in analog form. For example, information in digital form is less easily corrupted and more easily transformed than information in analog form. It is precisely these advantages that make the digital form desirable for information communication. Digital communication has evolved into a science and an industry. It is ubiquitous in our everyday world. Telephone systems, satellite television, compact disks (CDs), hard drives, and computer networks each rely on the principles of digital comnmunication.

Pulse amplitude modulation is a well-established technique of digital communications in which a sinusoidal carrier signal is modulated to one of two amplitude levels, corresponding to one of two in binary values. Multiple amplitude modulation is a similar technique in which the sinusoidal carrier is modulated to one of multiple discrete amplitude levels, each of which corresponds to one of multiple possible values. Quadrature amplitude modulation (QAM) is yet another established technique. QAM uses two sinusoidal carriers with that have the same frequency, but are 90 degrees out of phase. Because these carriers are orthogonal, they can each be independently modulated to one of multiple discrete amplitude levels. This significantly increases the amount of information that can be communicated in a given time interval. Details on these techniques can be found in many standard digital communications textbooks including, for example, Proakis, J. G., *Digital Communications,* 2/e, McGraw-Hill Book Company, New York, 1989.

While sinusoidal carriers may have some advantages, there exist other orthogonal waveforms which may also prove advantageous. FIG. 1 shows a sample of one such class of waveforms known as Walsh functions (Walsh, J. L., "A closed set of orthogonal fuinctions", American Journal of Math., vol.55, pp. 5–24, 1923). These functions have the desirable property that they are bipolar, i.e. the amplitude of each fuinction is either +1 or −1, and have applications as discussed by H. E. Harmuth, in "Applications of Walsh fuinctions in communications", IEEE Spectrum 1969.

As can be seen from FIG. 1, inside a basic interval $\beta$ from −½ to +½, the Walsh functions only take on 2 values, +1 and −1. Outside this interval the functions are zero. The odd functions of this series are labeled sal(i,$\beta$), where i is the "sequency" or "order" of the sal function. The order of the function is related to the number of zero crossings in the function, in that the number of zero crossings is 2x the order of the fuinction. The even functions of this series are termed cal(i,$\beta$) where i again is the order defined in the same way. Because each of the Walsh fuinctions are bi-valued, they are easy to generate using digital circuitry. Each Walsh function is characterized by order rather than by frequency.

Because Walsh functions are easily generated using digital circuitry, a desirable reduction in system complexity may be achieved by designing digital communications systems to exploit the properties of Walsh functions. This reduction in complexity, if accompanied by a consequent increase in reliability, may be particularly desirable for remote telemetry systems.

SUMMARY OF THE INVENTION

Accordingly, there is proposed herein a digital communications system which employs modulated Walsh functions to convey data across a communications channel. In, one embodiment, the system includes a transmitter having a constellation encoder, and a Walsh constellation modulator. The constellation encoder receives a sequence of n-bit data words and converts it into a sequence of m-bit "chunks" that represent constellation signal points. The modulator receives the sequence of chunks, and responsively generates one or more amplitude-modulated Walsh functions that are summed to produce a modulated signal. The modulated signal may then be filtered and transmitted across the communications channel to a receiver. The receiver preferably includes an analog-to-digital converter and a demodulation circuit. The analog-to-digital converter converts the received signal into a sequence of samples having multiple samples in each symbol period. The demodulation circuit manipulates the sign of the samples to effectively multiply the received samples with one or more Walsh functions, and sums the resulting values over one symbol interval to determine the modulated amplitude of the corresponding functions. A decision element may be included to determine the transmitted sequence of constellation signal points.

BRIEF DESCRIPTION OF THE DRAWINGS

A better understanding of the present invention can be obtained when the following detailed description of the preferred embodiment is considered in conjunction with the following drawings, in which.

Figure 1:
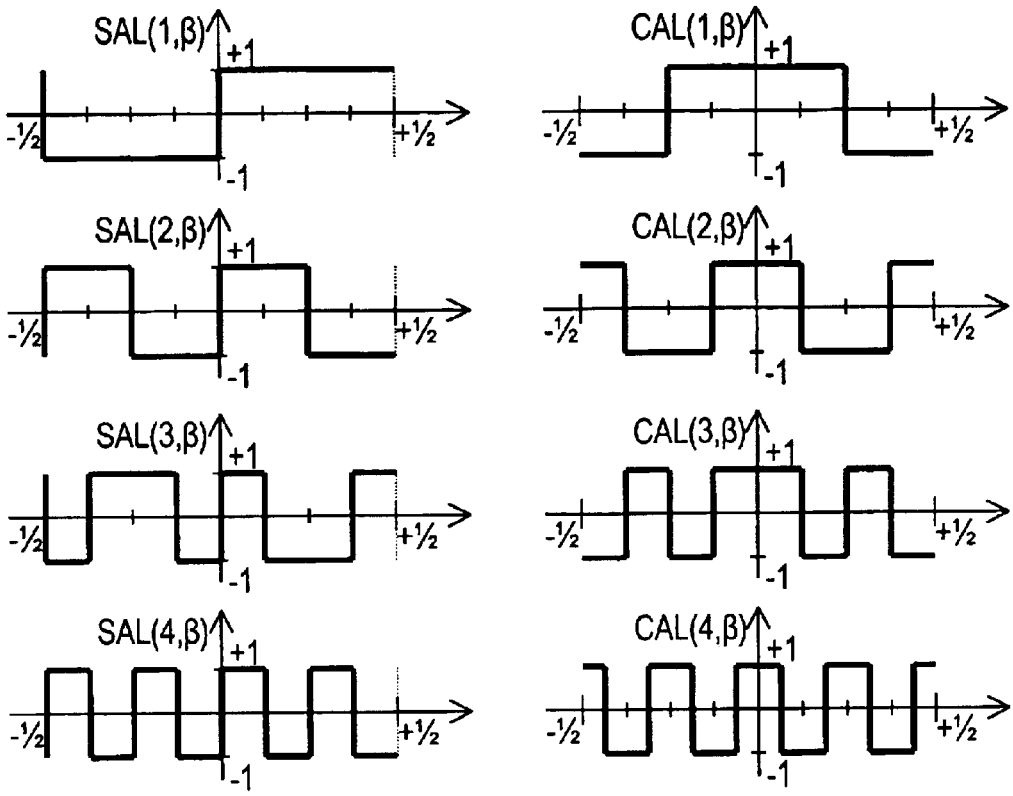
FIG. 1 PRIOR ART
FIG. 1 shows a set of Walsh functions.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

As used herein, the term "bi-valued function" is defined to be a time-dependent function that has exactly two characteristic values over the time interval for which it is defined. While transitions between the characteristic values are allowed, the time required for such transitions is substantially smaller than the residence time at the characteristic values.

DETAILED DESCRIPTION OF THE PREFERRED EMBODIMENT

QAM modulation has been used widely to attain high data rates in telemetry systems. A telemetry system is presented here that uses transmission of orthogonal functions as does conventional QAM. However, this system does not use sine and cosine as basis functions. This telemetry system uses a completely different set of basis functions which are more easily implemented using digital hardware.

Figure 2:
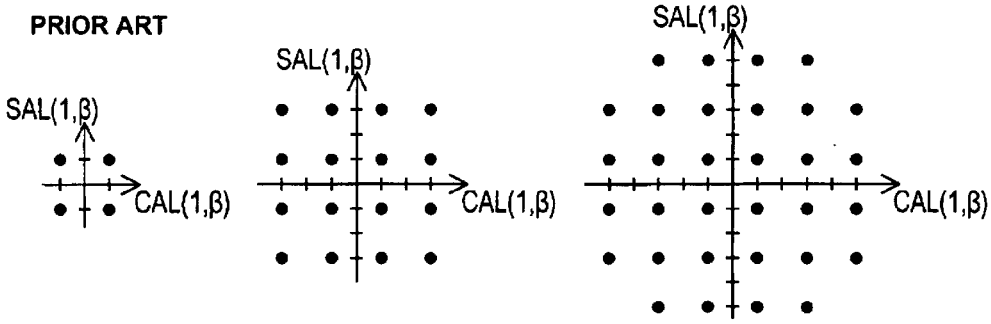
FIG. 2 PRIOR ART
FIG. 2 shows some exemplary two-dimensional constellations.

The signals that can be transmitted over a communications channel in a given time interval are commonly represented in the form of a signal constellation. The constellation has axes which correspond to the basis functions. When the basis functions are orthogonal, the axes are perpendicular. FIG. 2 shows some examples of signal constellations using two Walsh functions. The horizontal axis indicates the amplitude of the cal(1,β) function, and the vertical axis indicates the amplitude of the sal(1,β) function. The constellation includes a set of points. Each point represents a valid combination of the basis functions. For example, a point located at (−1,3) represents a signal equal to −1·cal(1,β)+3·sal(1,β).

Each of the signal points is preferably associated with a binary label. Various factors may be considered in selecting the labels for the signal points. For example, the labeling of the signal points may be designed to minimize the probability of bit error, or may be designed to simplify the design of the modulator. In any event, each signal point is given a unique label having a numeric value in the range from 0 to n−1, where n is the number of signal points in the constellation.

It is noted that other Walsh functions may be used in place of (or in addition to) cal(1,β) and sal(1,β). As the number of basis functions is increased or decreased, the number of axes in the constellation is increased or decreased accordingly. Thus if four basis functions are used, the constellation becomes four-dimensional. The modulated signal M(t) could be represented by:

$$M(t) = \sum_{k} \sum_{j=1}^{d/2} (x_{jk}\,\mathrm{cal}(j, t-kT) + y_{jk}\,\mathrm{sal}(j, t-kT))$$

where d is the number of dimensions of the constellation, T is the symbol period, and $(x_{1k}, y_{1k}, x_{2k}, y_{2k}, \ldots, x_{(d/2)k}, y_{(d/2k)})$ are the coordinates of the constellation signal point transmitted in the kth symbol interval.

Figure 3:
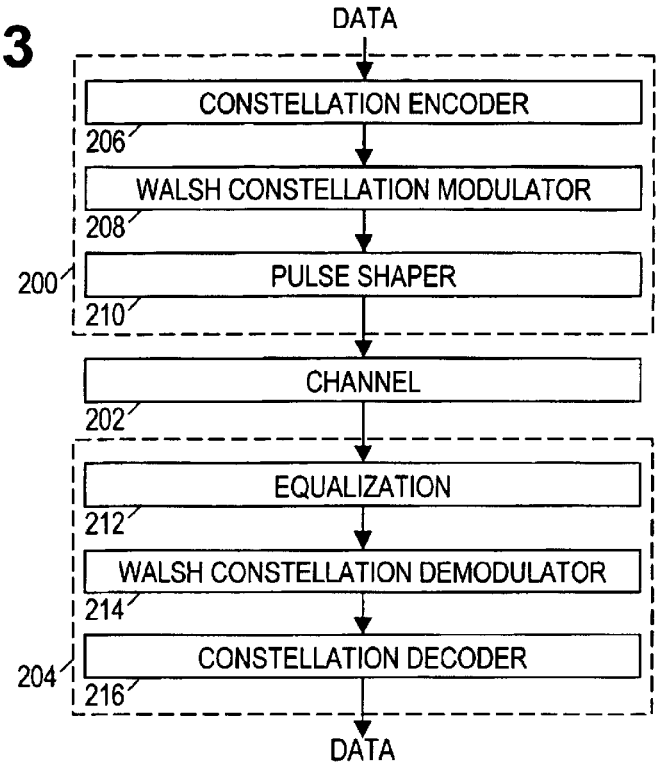
FIG. 3 is a functional block diagram of a telemetry system using modulated Walsh finctions.

FIG. 3 shows a block diagram of the communications portion of a telemetry system. Data from a sensor or other instrument is received by a transmitter 200. The transmitter 200 converts the data into a form suitable for conveyance across a communications channel 202. A receiver 204 receives a receive signal from the channel 202 and preferably converts it back into the data originally received by the transmitter 200.

Transmitter 200 may preferably include a constellation encoder 206, a Walsh constellation modulator 208, and a pulse shaper 210. The constellation encoder 206 operates to convert a sequence of data bytes or words into a sequence of constellation point labels. The number of signal points in a constellation is usually a power of 2, e.g. $32=2^5$. The number of bits in the binary label may accordingly be limited to the number necessary to represent the largest label. The encoder may be implemented in many ways. It may include an error correction code (ECC) encoder that encodes the data using any type of trellis code or block code. It may include an encryption or scrambling encoder. As discussed further below, it may include a partitioning register and a multiplexer to convert a stream of m-bit symbols into a stream of n-bit constellation point labels.

The Walsh constellation modulator 208 receives the stream of constellation point labels and converts them into a modulated signal. In each symbol interval, the modulated signal equals the combination of basis functions indicated by the corresponding constellation point label. Note that the modulated signal may represent a scaled and DC-offset version of the signal constellation, and that (if desired) a corrective scaling and DC offset may be applied to the modulated signal at any time prior to transmission.

The transmitter 200 may optionally include a pulse shaper 210. Often a power savings can be achieved by shaping the spectrum of the transmitted signal to match the spectrum of the communications channel 202. Accordingly, the pulse shaper 210 receives the modulated signal and filters the signal to selectively attenuate or amplify various frequency components of the modulated signal. For example, the shaper 210 may attenuate the high frequency components for a band-limited channel.

The communications channel 202 may be nearly any information transmission or storage medium. For example, the communications channel 202 may be electric signal transferred through a wireline cable in a well, or may be acoustic signals transmitted through the walls of a metal drill string, or may be electromagnetic waves traversing a distance between a transmitting antenna and a receiving antenna, or may be magnetic field intensities stored on a magnetic tape, etc. Note that generally, the transmitted signal suffers some corruption in transit. Typically the corruption is modeled as additive white Gaussian noise.

Receiver 204 may preferably include an equalizer 212, a Walsh constellation demodulator 214, and a constellation decoder 216. The equalizer 212 is preferably configured to maximize the signal-to-noise ratio of the received signal. It may be a matched filter, linear equalizer, adaptive filter, fractionally spaced equalizer, or any other suitable type of equalizer. The output of the equalizer is preferably representative of the modulated signal produced by the Walsh constellation modulator 208.

The demodulator 214 preferably converts the output of the equalizer into a sequence of constellation point labels. It may be implemented in a variety of ways, including a decision feedback equalizer, maximum likelihood sequence estimator, minimum distance estimator, or any other suitable decision mechanism. The constellation decoder 216 then performs the inverse operation of encoder 206. If the encoder 206 included an error correction code encoder, then decoder 216 includes a decoder for that error correction code. If the encoder 206 included a partitioning register, then the decoder 216 includes a framing register for re-assembling the data bytes.

Figure 4:
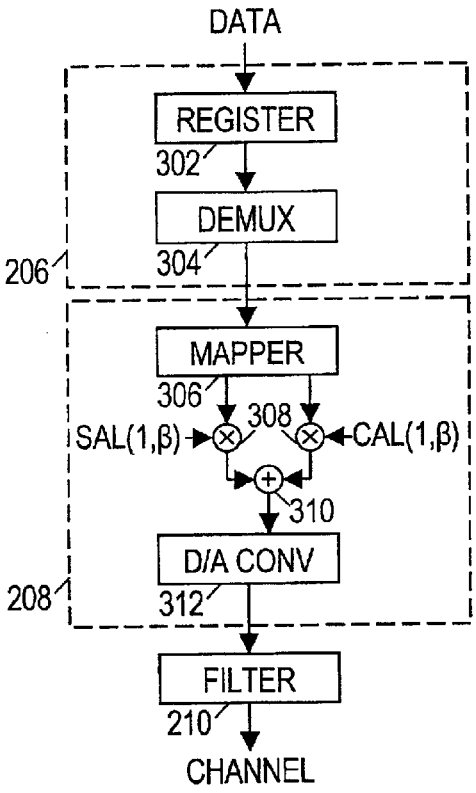
FIG. 4 is a functional block diagram of a telemetry transmitter using Walsh functions.

FIG. 4 shows a more detailed block diagram of transmitter 200. In a preferred embodiment, encoder 206 includes a partitioning register 302 and a demultiplexer 304. Register 302 preferably latches one 8-bit byte or one 16-bit word of data at a time, although this can be readily altered to accommodate the system parameters. Assume that register 302 holds n bits, where n is some integer multiple of m. The register may be partitioned into m-bit "chunks". For example, n may be 8 and m may be 4, so that the register is partitionable into two 4-bit chunks. The demultiplexer switches multiple times so as to forward each of the chunks to modulator 208 before the next data word is latched. Note that an error correction code encoder may be incorporated into the constellation encoder 206 if desired.

Modulator 208 includes a mapper 306, multipliers 308, summer 310, and a digital-to-analog converter 312. The maper 306 is preferably a look-up table that generates the coordinates of a constellation point label in response to each of the data chunks. The look-up table can be programmed for any arbitrary correspondence between constellation point labels and constellation point coordinates. Mapper 306 may alternatively be implemented as a logic circuit.

Multipliers 308 multiply the constellation point coordinates with the corresponding basis functions. Note that because the basis functions are limited to +1 and −1 values, this multiplication can be accomplished by merely manipulating the sign bit of the coordinates. This "multiplier" may consequently be nothing more than a logical XOR gate.

Returning momentarily to FIG. 1, it is noted that the cal(1,β) and sal(1,β) functions make transitions at quarter-symbol intervals, i.e. −½, −¼, 0, and ¼. Between these transitions, the functions are constant. Consequently, the modulated signal is completely represented by the signal values in the four quarter-intervals.

Summer 310 adds the outputs of the multipliers. Note that because of the basis functions chosen no more than four additions are necessary to produce the modulated signal in one symbol interval. The digital-to-analog converter 312 then converts the modulated signal from digital form to analog form, e.g. to a voltage signal. Shaper 210 is shown as a filter which receives the analog signal and shapes the spectrum of the analog signal as desired.

Figure 5:
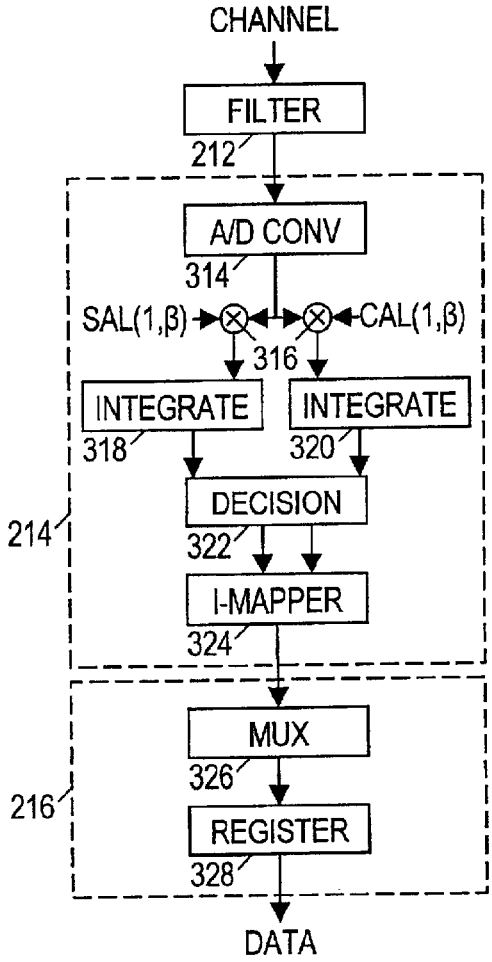
FIG. 5 is a functional block diagram of a telemetry receiver using Walsh functions.

FIG. 5 shows a more detailed block diagram of receiver 204. Equalizer 212 is shown as an analog filter designed to minimize added noise. Demodulator 214 may preferably include an analog-to-digital converter 314, multipliers 316, integrators 318, 320, decision element 322, and an inverse mapper 324.

Analog-to-digital converter 314 samples the filtered receive signal in response to a clock signal. The clock signal may be generated by a timing recovery module that operates on the filtered receive signal. Because the shape of the basis functions guarantees that any modulated signal will have at least three transitions in each symbol interval (i.e. on the quarter intervals of −¼, 0, ¼), timing recovery should be fairly straightforward. Synchronization can be achieved by a training sequence designed to eliminate the transitions between symbol intervals. The analog-to-digital converter 314 preferably samples the filtered receive signal at least four times in each symbol interval.

Multipliers 316 multiply each of the samples by the basis functions. As before, this reduces to manipulation of the sign bit. Integrators 318 and 320 each integrate the respective products over a symbol interval. This ideally produces the coordinate values, but due to the presence of noise, the coordinate values may differ from the ideal. It is noted that multiple implementations exist. For example, the multipliers and integrators may be implemented in the form of filters having a decimated output.

Decision element 322 is preferably a minimum distance detector that determines which signal point is closest to the coordinates specified by the integrators. The coordinates of this signal point are provided to the inverse mapper 324 which coverts the signal point coordinates into the corresponding data chunk. The stream of data chunks is provided to the constellation decoder 216.

Decoder 216 preferably includes a multiplexer 326 and a framing register 328. The multiplexer 326 assembles the m-bit data chunks in the register 328 to form n-bit data words, which are then provided as output from the decoder. Of course, decoder 216 may include an error correction code decoder to correct errors if encoder 206 included a corresponding error correction encoder.

Accordingly, the use of Walsh functions as basis functions for a signaling constellation provides several advantages. The complexity of the transmitter and receiver are significantly reduced by the elimination of full-blown multipliers. Timing recovery and conversion between analog and digital domains is also made simpler and more accurate. In fact the D/A conversion process requires a much lower resolution than a typical QAM system. The D/A converter can be limited to the possible levels that are the sums of the two Walsh basis function without introducing quantizing errors.

One concern that may be articulated is that the sharp edges of the Walsh functions would be quickly lost due to attenuation of higher frequencies in the channel. Most channels of interest experience attenuation that increases with frequency. Consequently, such channels would attenuate the 3rd harmonic (⅑ the power in the fundamental), the 5th harmonic (1/25) the power in the fundamental, and so on. The fundamental frequency would remain, and will be faithfully passed by the channel with an amplitude proportional to the amplitude of the modulated basis function. The received signal consequently contains the information desired, i.e. the amplitudes of the Walsh functions.

As an aside, it is noted that because the sal(1,β) and cal(1,β) basis functions have no even harmonics in their Fourier series expansions (only the fundamental and odd harmnonics), aliasing of the modulated signal is not an issue. Therefore modulation of the basis functions could theoretically be extended from DC to twice the symbol frequency.

Although the system is described in terms of a single transmitter and receiver, it should be recognized that bi-direction communication necessitates a second transmitter and receiver to communicate in the opposite direction. In addition, repeaters may also be included along the communications channel to extend the signaling range.

Numerous variations and modifications will become apparent to those skilled in the art once the above disclosure is fully appreciated. For example, nearly every existing QAM architecture could be adapted to employ Walsh functions in place of sinusoidal basis functions. It is intended that the following claims be interpreted to embrace all such variations and modifications.

What is claimed is:

1. A transmitter that comprises:

a constellation encoder configured to receive a sequence of n-bit data words and configured to convert the sequence of data words into a sequence of m-bit constellation signal point labels; and a modulator configured to receive the sequence of signal point labels and configured to responsively generate at least one amplitude-modulated bi-valued function having an amplitude in each symbol interval determined by a corresponding signal point label in the sequence of signal point labels.

2. The transmitter of claim 1, wherein the modulator is further configured to generate a second amplitude-modulated bi-valued fumction that is orthogonal to said at least one amplitude-modulated bi-valued function, wherein the amplitude-modulated square waves are summed to produce a modulated signal.

3. The transmitter of claim l, wherein the bi-valued function is any Walsh function.

4. The transmitter of claim l, wherein the modulator is a digital circuit.

5. A method of data communication, comprising:

receiving a sequence of data words;

converting the sequence of data words into a sequence of sets of constellation signal point coordinate values, wherein the sequence of sets can be represented as:

$(x_{1k}, y_{1k}, x_{2k}, y_{2k}, \ldots, x_{(d/2)k}, y_{(d/2)k})$, k=1, 2, . . . , wherein k is the sequence index, and d is the dimensionality of the constellation; and producing a modulated signal M(t) that can be represented as:

$$M(t) = \sum_{k} \sum_{j=1}^{d/2} (x_{jk}\,\mathrm{cal}(j, t-kT) + y_{jk}\,\mathrm{sal}(j, t-kT))$$

wherein T is a symbol period.

6. A receiver that comprises:

an analog-to-digital converter configured to convert a received signal into a sequence of samples, wherein multiple samples are taken in each symbol period;

a circuit configured to manipulate the sign of the sequence of samples in accordance with a Walsh function, and further configured to sum the resulting values over each symbol period.

7. The receiver of claim 6, further comprising:

a second circuit configured to manipulate the sign of the sequence of samples in accordance with a second, different Walsh function, and further configured to sum a second set of resulting values over each symbol period; and a decision element configured to convert the resulting values into a sequence of signal constellation points.

8. The receiver of claim 7, further comprising:

a constellation decoder configured to convert the sequence of signal constellation points into a sequence of n-bit data words.

* * * * *